United States Patent
Kang

(10) Patent No.: US 10,339,004 B2
(45) Date of Patent: Jul. 2, 2019

(54) CONTROLLER AND OPERATION METHOD THEREOF

(71) Applicant: SK hynix Inc., Gyeonggi-do (KR)

(72) Inventor: Soon-Young Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/826,881

(22) Filed: Nov. 30, 2017

(65) Prior Publication Data

US 2018/0329778 A1 Nov. 15, 2018

(30) Foreign Application Priority Data

May 10, 2017 (KR) .......................... 10-2017-0058003

(51) Int. Cl.
*G06F 3/06* (2006.01)
*G06F 11/10* (2006.01)

(52) U.S. Cl.
CPC ........ *G06F 11/1076* (2013.01); *G06F 3/0607* (2013.01); *G06F 3/068* (2013.01); *G06F 3/0619* (2013.01); *G06F 3/0626* (2013.01); *G06F 3/0632* (2013.01); *G06F 3/0679* (2013.01)

(58) Field of Classification Search
CPC .. G06F 11/1076; G06F 3/0619; G06F 3/0632; G06F 3/068; G06F 3/0607
See application file for complete search history.

(56) References Cited

U.S. PATENT DOCUMENTS

| | | | | |
|---|---|---|---|---|
| 9,009,578 | B1* | 4/2015 | Varnica | H03M 13/37 714/785 |
| 2013/0061107 | A1* | 3/2013 | Wang | H03M 13/1117 714/752 |
| 2013/0097475 | A1* | 4/2013 | Wang | H03M 13/1108 714/784 |
| 2014/0108883 | A1* | 4/2014 | Tehrani | G06F 11/1012 714/758 |

(Continued)

FOREIGN PATENT DOCUMENTS

KR    1020120053122    5/2012

OTHER PUBLICATIONS

Reliability-Based Iterative Decoding Algorithm for LDPC Codes With Low Variable-Node Degree J. M. Català-Pérez, F. García-Herrero, J. Valls, K. Liu and S. Lin IEEE Communications Letters, vol. 18, No. 12, pp. 2065-2068, Dec. 2014.*

*Primary Examiner* — Cynthia Britt
(74) *Attorney, Agent, or Firm* — IP & T Group LLP

(57) ABSTRACT

A controller including: an initialization unit initializing values and states of variable nodes and initializing values of check nodes; a variable node update unit updating the values and states of the variable nodes; a check node update unit updating the values of the check nodes based on the updated values and states of the variable nodes; and a syndrome check unit deciding iteration of the operation of the variable node update unit and the check node update unit when the values of the check nodes are not all in a satisfied state, the variable node update unit calculates reliability values of the variable nodes and a reference flip value based on a result of a previous iteration, and the variable node update unit updates the values and states of the variable nodes based on the reference flip value and the reliability values and states of the variable nodes.

18 Claims, 10 Drawing Sheets

(56) References Cited

U.S. PATENT DOCUMENTS

2016/0179620 A1* 6/2016 Bazarsky ............. H03M 13/116
  714/766
2017/0046220 A1* 2/2017 Sharon .................. G06F 3/0619
2018/0191375 A1* 7/2018 Bear .................... G06F 11/1076
2018/0329778 A1* 11/2018 Kang .................. G06F 11/1076

* cited by examiner

CONTROLLER AND OPERATION METHOD THEREOF

CROSS-REFERENCE TO RELATED APPLICATIONS

The present application claims priority of Korean Patent Application No. 10-2017-0058003, filed on May 10, 2017, which is incorporated herein by reference in its entirety.

BACKGROUND

1. Field

Exemplary embodiments of the present invention relate to a memory system, and more particularly, to a memory system for processing data by using a memory device, and a method for operating the memory system.

2. Description of the Related Art

The paradigm for computing environments is shifting toward ubiquitous computing which allows users to use computer systems anytime anywhere. For this reason, the demands for portable electronic devices, such as mobile phones, digital cameras and laptop computers are soaring. Those electronic devices generally include a memory system using a memory device as a data storage device. The data storage device may be used as a main memory unit or an auxiliary memory unit of a portable electronic device.

Since the data storage device using a memory device is not provided with a mechanical driving unit, it may have excellent stability and durability. Also, the data storage device has a quick data access rate with low power consumption. Non-limiting examples of the data storage device having such advantages include Universal Serial Bus (USB) memory devices, memory cards of diverse interfaces, Solid-State Drives (SSD) and the like.

SUMMARY

Embodiments of the present invention are directed to a memory system that minimizes complexity and performance deterioration of the memory system, maximizes the usage efficiency of a memory device, and rapidly and stably processes data into a memory device, and a method for operating the memory system.

In accordance with an embodiment of the present invention, a controller including: initialization unit suitable for initializing values and states of variable nodes and initializing values of check nodes; a variable node update unit suitable for updating the values and states of the variable nodes; check node update unit suitable for updating the values of the check nodes based on the updated values and states of the variable nodes; and syndrome check unit suitable for deciding iteration of the operation of the variable node update unit and the check node update unit when the values of the check nodes are not all in a satisfied state, wherein the variable node update unit calculates reliability values of the variable nodes and a reference flip value based on a result of a previous iteration, and wherein the variable node update unit updates the values and states of the variable nodes based on the reference flip value and the reliability values and states of the variable nodes.

The initialization unit may initialize the values and states of the variable nodes and initialize the values of the check nodes by using a code word read from a memory device.

Each of the variable nodes may have one state among N states, the variable node update unit may update a value of a first variable node by flipping the value of the first variable node when a reliability value of the first variable node having an $i^{th}$ state is equal to or greater than an $i^{th}$ reference flip value, and N is an integer equal to or greater than 2, and "i" is an integer ranging from 1 to N.

The variable node update unit may update the state of the first variable node into a $(j+1)^{th}$ state when the reliability value of the first variable node having the $i^{th}$ state may be equal to or greater than a $(j+1)^{th}$ reference flip value and smaller than a $j^{th}$ reference flip value, the $j^{th}$ reference flip value may be equal to or greater than the $(j+1)^{th}$ reference flip value, and "j" is an integer ranging from 1 to N−1.

The variable node update unit may update a state of the first variable node into a first state when the reliability value of the first variable node having the $i^{th}$ state may be equal to or greater than the first reference flip value.

The variable node update unit may keep the state of the first variable node unchanged when the reliability value of the first variable node having the $i^{th}$ state is smaller than an $N^{th}$ reference flip value.

Herein, N may be 2. Herein, N may be 4.

When the values of all of the check nodes are '0', the values of the check nodes are all in the satisfied state.

In accordance with an embodiment of the present invention, a method for operating a controller, the method including: initializing values and states of variable nodes and initializing values of check nodes; updating the values and states of the variable nodes; updating the values of the check nodes based on the updated values and states of the variable nodes; and deciding iteration of the updating of the values and states of the variable nodes and the updating of the values of the check nodes when the values of the check nodes are not all in a satisfied state, wherein the updating of the values and states of the variable nodes includes: calculating a reference flip value and reliability values of the variable nodes based on a result of a previous iteration; and updating the values and states of the variable nodes based on the reference flip value and the reliability values of the variable nodes.

The initializing is performed by using a code word read from a memory device.

Each of the variable nodes has one state among N states, the updating of the values and states of the variable nodes includes updating a value of a first variable node, when a reliability value of the first variable node having an $i^{th}$ state is equal to or greater than an $i^{th}$ reference flip value in the updating of the values and states of the variable nodes, and N is an integer equal to or greater than 2, and "i" is an integer ranging from 1 to N.

The updating of the values and states of the variable nodes includes updating the state of the first variable node into a $(j+1)^{th}$ state, when the reliability value of the first variable node having the $i^{th}$ state is equal to or greater than a $(j+1)^{th}$ reference flip value and smaller than a $j^{th}$ reference flip value in the updating of the values and states of the variable nodes, the $j^{th}$ reference flip value is equal to or greater than the $(j+1)^{th}$ reference flip value, and j is an integer ranging from 1 to N−1.

The updating of the values and states of the variable nodes includes updating a state of the first variable node into a first state when the reliability value of the first variable node having the $i^{th}$ state is equal to or greater than the first reference flip value.

The updating of the values and states of the variable nodes includes keeping the state of the first variable node unchanged when the reliability value of the first variable node having the $i^{th}$ state is smaller than an $N^{th}$ reference flip value.

Herein, N may be '2'. Herein, N may be '4'.

When the values of all of the check nodes are '0', the values of the check nodes are all in the satisfied state.

DETAILED DESCRIPTION

Figure 1:
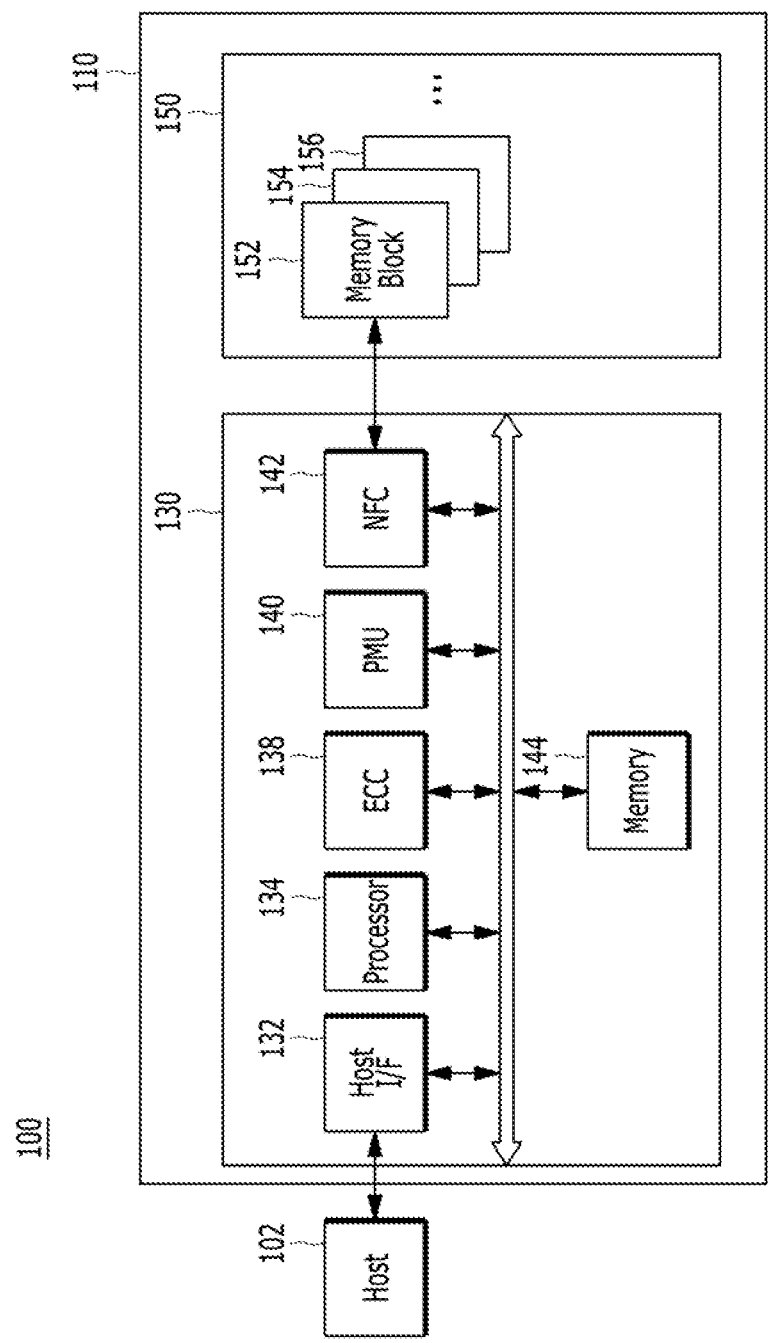
FIG. 1 is a block diagram illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "Includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may be any suitable electronic device including a portable electronic device such as a mobile phone, an MP3 player and a laptop computer or a non-portable electronic device such as a desktop computer, a game machine, a TV and a projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request received from the host 102. Non-limited examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may employ various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control storing data into the memory device 150 and reading data from the memory device 150 and transferring the read data to the host HOST.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through any suitable method included a coded modulation such as Low-Density Parity Check (LDPC) code, Bose-Chaudhuri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices needed for error correction.

The PMU 140 may provide and manage power of the controller 130. Any suitable PMU may be employed.

The NFC 142 is an example of a suitable memory/storage interface for interfacing the controller 130 and the memory device 150 such that the controller 130 controls the memory device 150 in response to a request from the host 102, when the memory device is a NAND flash memory. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150. A suitable memory/storage interface may be selected depending upon the type of the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random-access memory (SRAM) or dynamic random-access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to a characteristic of the memory device, for example, a NAND flash memory during a program operation, among the plurality of memory blocks 152 to 156 included in the memory device 150. The management unit may write the program-failed data of the bad block to a new memory block. In a memory device 150 having a 3D stack structure, the bad block management operation may reduce the use efficiency of the memory device 150 and the reliability of the memory system 110. Thus, the bad block management operation needs to be performed with more reliability.

Figure 2:
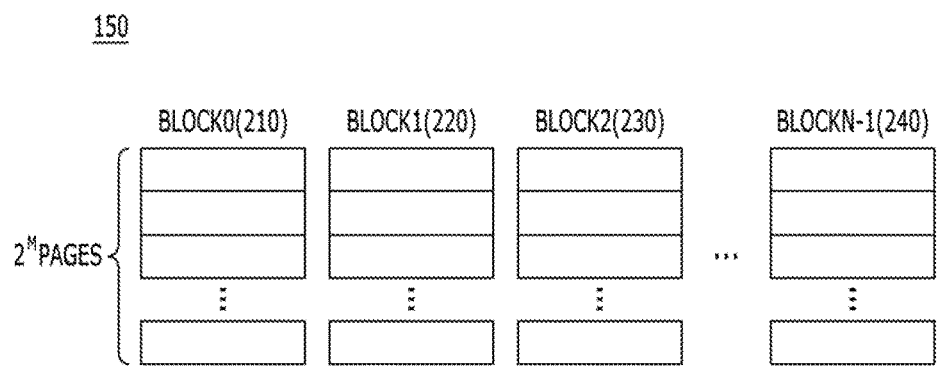
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
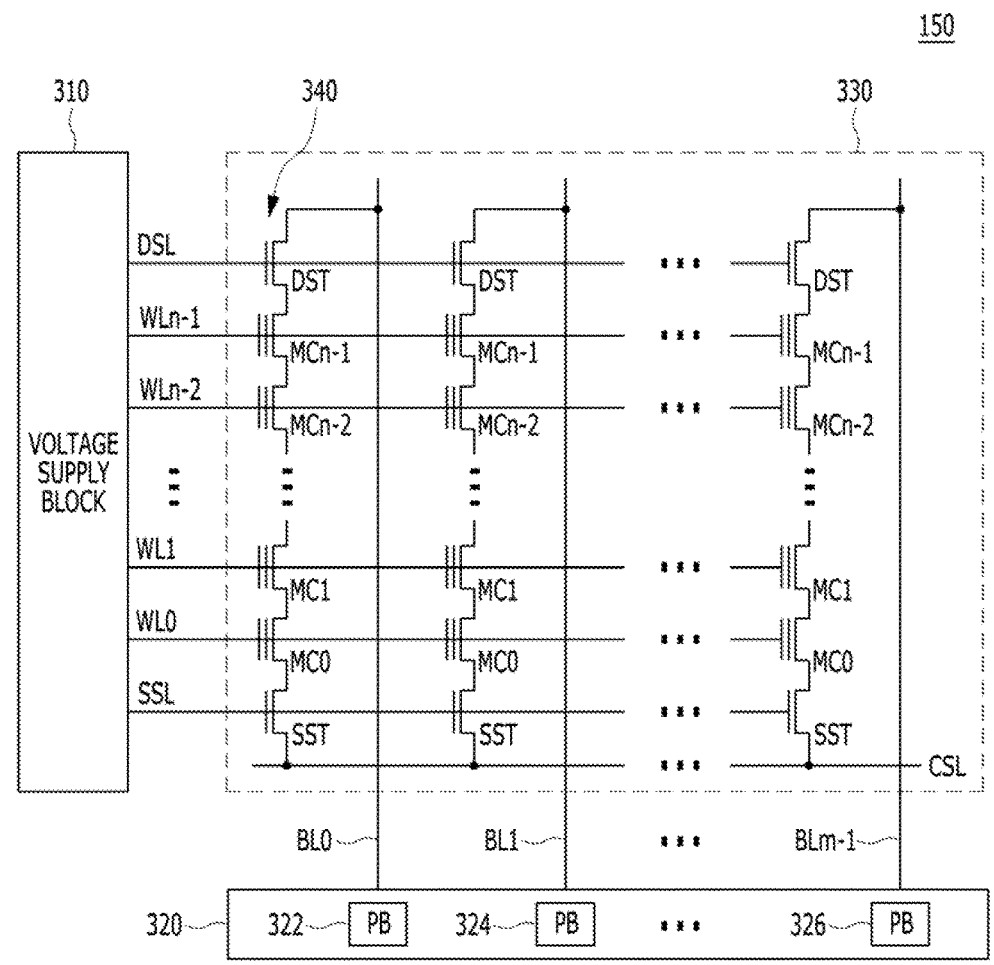
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply block 310 which provides word line voltages including a program voltage, a read voltage and a pass voltage to supply to the word lines according to an operation mode. The voltage generation operation of the voltage supply block 310 may be controlled by a control circuit (not illustrated). Under the control of the control circuit, the voltage supply block 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
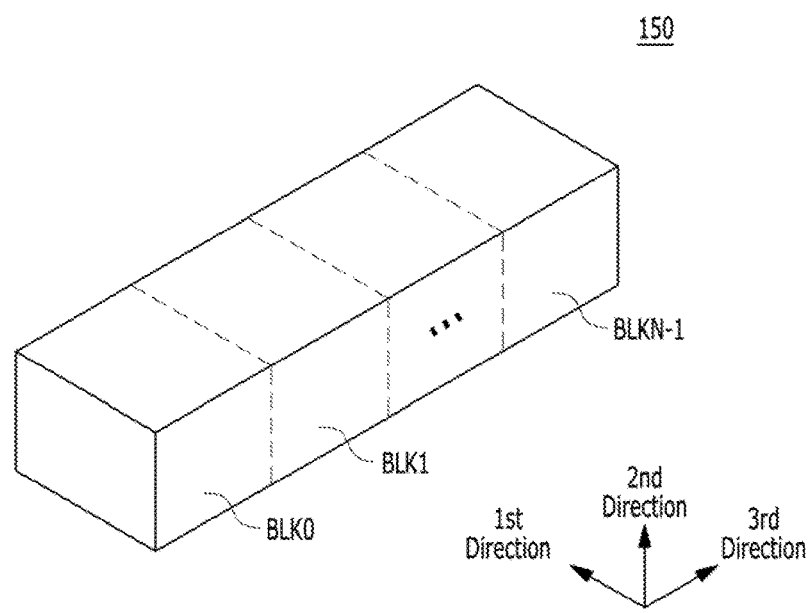
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5A:
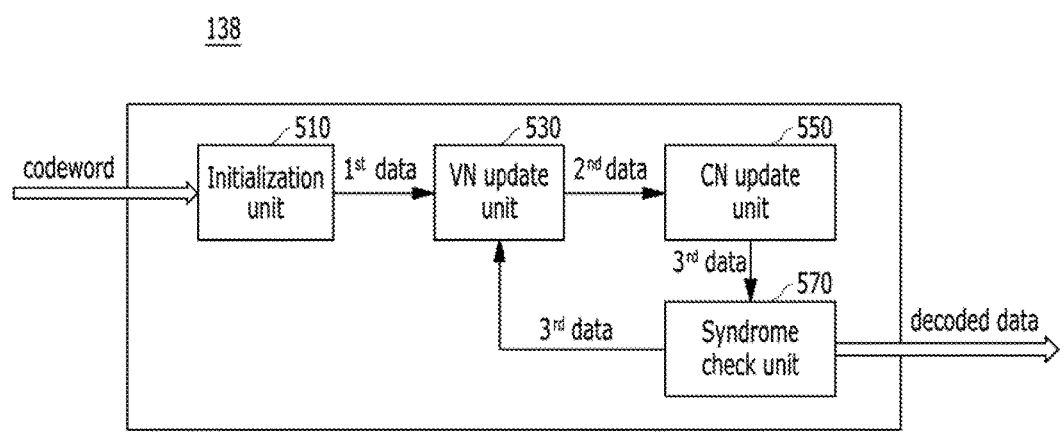
FIG. 5A is a block diagram illustrating an error correction code (ECC) unit 138 in accordance with an embodiment of the present invention.

FIG. 5A is a block diagram illustrating the error correction code (ECC) unit 138 in accordance with an embodiment of the present invention.

Figure 5B:
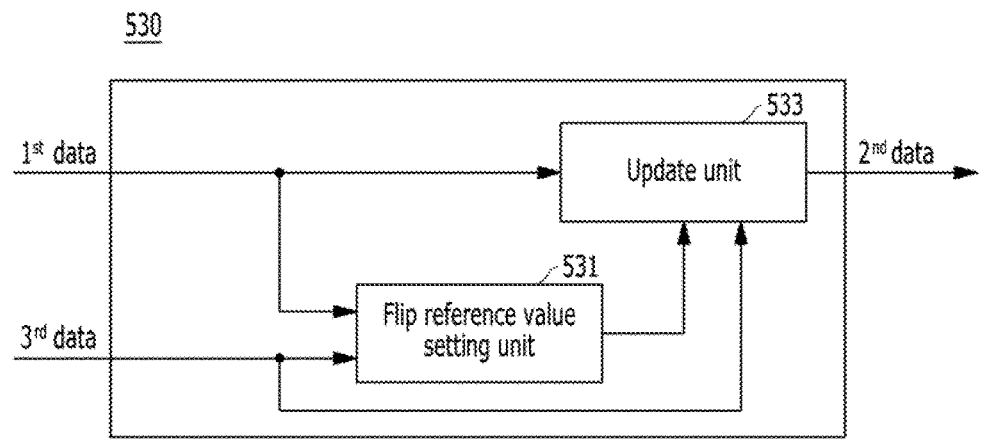
FIG. 5B is a block diagram illustrating a variable node update unit 530 of the ECC unit 138 in accordance with the embodiment of the present invention.

FIG. 5B is a block diagram illustrating a variable node update unit 530 of the ECC unit 138 in accordance with the embodiment of the present invention.

Referring to FIG. 5A, the ECC unit 138 may include an initialization unit 510, the variable node update unit 530, a check node update unit 550, and a syndrome check unit 570.

The ECC unit 138 may generate a decoded data in which an error of a code word is corrected by repeatedly performing an error correction decoding onto the code word which is read from the memory device 150. The ECC unit 138 may output the decoded data, which is a result of the repeated error correction decoding operation performed onto the code word. Herein, the code word may be a sequence of data that are read from the memory cells of a word line in the memory device 150. For example, when the number of memory cells coupled to a word line is 8000, the code word may be a sequence of 8000 bits.

The initialization unit 510 may initialize variable nodes by using the code word. The initialization unit 510 may set the values of the first to last bits of the code word as the initial values of the variable nodes.

The initialization unit 510 may set the initial state of each of the variable nodes. Herein, the variable nodes may have N states, where N is a natural number that is equal to or greater than 2.

In an embodiment, when N is 2, the initialization unit 510 may randomly set a first state or a second state as the initial state of each of the variable nodes. Likewise, for example, when N is 4, the initialization unit 510 may randomly set one among first to fourth states as the initial state of each of the variable nodes. Herein, the state of the variable node may be a data that is referred when flipping the value of the variable node.

In an embodiment, the initialization unit 510 may set the initial state of each of the variable nodes according to positions of the variable nodes. For example, the initialization unit 510 may set the first state as the initial states of odd variable nodes and the second state as the initial states of even variable nodes.

In an embodiment, the initialization unit 510 may set the initial state of each of the variable nodes according to channel condition. For example, the initialization unit 510 may set the first state as the initial state of variable nodes of a relatively good channel condition and the second state as the initial state of variable nodes of a relatively poor channel condition.

The initialization unit 510 may set the initial value of the check nodes by using the initialized variable nodes. For example, the initialization unit 510 may initialize the value of each of the check nodes through a result of a Modulo 2 operation to the sum of the initial values of the variable nodes coupled to the check nodes.

The initialization unit 510 may transfer to the variable node update unit 530 a first data including the initial value and initial state of each of the variable nodes and the initial value of each of the check nodes.

Referring to FIG. 5B, the variable node update unit 530 may include a flip reference value setting unit 531 and an update unit 533.

The variable node update unit 530 may generate a second data by updating the value of the respective variable nodes based on the first data provided from the initialization unit 510 and a third data provided from the syndrome check unit 570 and transfer the generated second data to the check node update unit 550. The third data will be described later.

The flip reference value setting unit 531 may set a flip reference value for deciding whether to flip the value of each of the variable nodes. Herein, the flip reference value may include a reference flip value and a reliability value of each of the variable nodes.

The flip reference value setting unit 531 may calculate the reference flip value according to the current number of times that the repeated decoding is performed, the result of the previous repeated decoding, and the number of states that the variable nodes may have.

For example, the flip reference value setting unit 531 may calculate the reference flip value based on the following Equation 1.

$$V^{th}(i,j) = (N_{UCN}(i-1) + \alpha_j \times i) \times \beta_j \quad \text{[Equation 1]}$$

In equation 1, $V_{th}(i,j)$ is a $j^{th}$ reference flip value of an $i^{th}$ repeated decoding; "i" is the current number of times that the repeated decoding is performed; "j" is an integer ranging from 1 to N; "N" is the number of the states that the variable nodes may have; $N_{UCN}(i-1)$ is the number of unsatisfied check nodes in an $(i-1)^{th}$ repeated decoding; and "$\alpha j$" and "$\beta j$" are weights applied to the $j^{th}$ reference flip value. Herein, "$\alpha j$" and "$\beta j$" may be set in advance in such a manner that a first reference flip value has the greatest value and an $N^{th}$ reference flip value has the smallest value. An unsatisfied check node may have a value of '1'.

In a first repeated decoding, $N_{UCN}(0)$ is the number of unsatisfied check nodes having a value of '1' among the initial values of the respective check nodes included in the first data.

The flip reference value setting unit 531 may calculate the reliability value of each of the variable nodes based on the previous repeated decoding result.

For example, the flip reference value setting unit 531 may calculate the reliability value of each of the variable nodes based on the following Equation 2.

$$R(i,k) = (\gamma \times N_{UCN}(i-1,k) + \delta \times N_{SCN}(i-1,k)) \quad \text{[Equation 2]}$$

In equation 2, R(i,k) is the reliability value of a $k^{th}$ variable node in an $i^{th}$ repeated decoding; $N_{UCN}(i-1,k)$ is the number of unsatisfied check nodes that are coupled to the $k^{th}$ variable node in an $(i-1)^{th}$ repeated decoding; $N_{SCN}(i-1,k)$ is the number of satisfied check nodes that are coupled to the $k^{th}$ variable node in the $(i-1)^{th}$ repeated decoding; and "yj" and "$\delta j$" are weights applied to the reliability value of a $k^{th}$ variable node.

In the first repeated decoding, $N_{UCN}(0,k)$ is the number of unsatisfied check nodes having a value of '1' that are coupled to the $k^{th}$ variable node which is included in the first data. $N_{SCN}(0,k)$ is the number of satisfied check nodes having a value of '0' that are coupled to the $k^{th}$ variable node which is included in the first data.

The flip reference value setting unit 531 may set the calculated reference flip values and reliability values as the flip reference value for deciding whether to flip the value of each of the variable nodes.

The update unit 533 may flip the initial value of each of the variable nodes based on the initial value and initial state of each of the variable nodes provided from the initialization unit 510 and the flip reference value provided from the flip reference value setting unit 531, and at the same time, update the state of each of the variable nodes. Likewise, the update unit 533 may flip an updated value of each of the variable nodes based on the updated value and updated state of each of the variable nodes included in the third data provided from the syndrome check unit 570 and the flip reference value provided from the flip reference value setting unit 531, and at the same time, update the state of each of the variable nodes.

When the number of the states that the variable nodes may have is N and the reliability value of a variable node having an $x^{th}$ state is equal to or greater than an $x^{th}$ reference flip value, the update unit 533 may update the state of the variable node by flipping the value of the variable node. Herein, x is an integer ranging from 1 to N.

Also, when the number of the states that the variable nodes may have is N and the reliability value of the variable node having an $x^{th}$ state is equal to or greater than a first reference flip value, the update unit 533 may update the state of the variable node into a first state. If the reliability value of the variable node having an $x^{th}$ state is equal to or smaller than an $N^{th}$ reference flip value, the update unit 533 may keep the current $x^{th}$ state of the variable node. If the reliability value of the variable node is less than a $y^{th}$ reference flip value and equal to or greater than a $(y+1)^{th}$ reference flip value, the update unit 533 may update the state of the variable node by changing the state of the variable node from the $x^{th}$m state into a $(y+1)^{th}$ state. Herein, x is an integer ranging from 1 to N, and y is an integer ranging from 1 to N−1.

When the number of the states that the variable nodes may have is 2, the update unit 533 may flip the initial value or the updated value of each of the variable nodes and update the state of each of the variable nodes.

TABLE 1

| Condition | 1st State | | 2nd State | |
|---|---|---|---|---|
| | Flip | State Updated | Flip | State Updated |
| $R(i, k) \geq V_{th}(i, 1)$ | ○ | 1st State | ○ | 1st State |
| $V_{th}(i, 1) > R(i, k) \geq V_{th}(i, 2)$ | X | 2nd State | ○ | 2nd State |
| $V_{th}(i, 2) > R(i, k)$ | X | 1st State | X | 2nd State |

Referring to Table 1, in an $i^{th}$ repeated decoding, when the state of the $k^{th}$ variable node is the first state and the reliability value (R(i,k)) of the $k^{th}$ variable node is greater than a first reference flip value $V_{th}(i,1)$, the update unit 533 may keep the state of the $k^{th}$ variable node and decide to flip the value of the $k^{th}$ variable node. As a result, in the $i^{th}$ repeated decoding, the value of the $k^{th}$ variable node may be flipped and the state of the $k^{th}$ variable node may remain as the first state.

Referring to Table 1, in an $i^{th}$ repeated decoding, when the state of the $k^{th}$ variable node is the second state and the reliability value (R(i,k)) of the $k^{th}$ variable node is smaller than a second reference flip value $V_{th}(i,2)$, the update unit 533 may keep the state of the $k^{th}$ variable node and decide not to flip the value of the $k^{th}$ variable node. As a result, in the $I^{th}$ repeated decoding, the value of the km variable node may not be flipped and the state of the $k^{th}$ variable node may remain as the second state.

Also, when the number of the states that the variable nodes may have is 4, the update unit 533 may flip the initial value or the updated value of each of the variable nodes and update the state of each of the variable nodes as shown in the following Table 2.

Referring to Table 2, in an it repeated decoding, when the state of the $k^{th}$ variable node is the first state and the reliability value (R(i,k)) of the $k^{th}$ variable node is smaller than a first reference flip value $V_{th}(i,1)$ and equal to or greater than a second reference flip value $V_{th}(i,2)$, the update unit 533 may change the state of the $k^{th}$ variable node into the second state and decide not to flip the value of the $k^{th}$ variable node. As a result, in the $i^{th}$ repeated decoding, the value of the $k^{th}$ variable node may not be flipped and the state of the $k^{th}$ variable node may become the second state.

Referring to Table 2, in the $i^{th}$ repeated decoding, when the state of the $k^{th}$ variable node is the fourth state and the reliability value (R(i,k)) of the $k^{th}$ variable node is smaller than the first reference flip value $V_{th}(i,1)$ and equal to or greater than the second reference flip value $V_{th}(i,2)$, the update unit 533 may change the state of the $k^{th}$ variable node into the second state and decide to flip the value of the $k^{th}$ variable node. As a result, in the $i^{th}$ repeated decoding, the value of the $k^{th}$ variable node may be flipped and the state of the $k^{th}$ variable node may become the second state.

In short, the update unit 533 may update the value and state of each of the variable nodes according to the relative position among the reference flip values of the reliability values of the variable nodes and the state of each of the variable nodes. Referring to Tables 1 and 2, the reference flip values used for deciding whether to flip or not may be different each other according to the state of each of the variable nodes. Also, referring to Tables 1 and 2, when the reliability value of each of the variable nodes is smaller than a smallest reference flip value, the current state of each of the variable nodes may remain unchanged.

The update unit 533 may provide the second data that includes the updated value and updated state of each of the variable nodes to the check node update unit 550.

Referring back to FIG. 5A, the check node update unit 550 may update the check nodes by using the second data. For example, the check node update unit 550 may update the value of each of the check nodes with a result of a Modulo 2 operation to the sum of the updated values of the variable nodes coupled to the check nodes.

The check node update unit 550 may provide to the syndrome check unit 570 the third data that includes the updated value of each of the variable nodes and the updated value of each of the check nodes.

TABLE 2

| | Condition | | | | | | | |
|---|---|---|---|---|---|---|---|---|
| | 1st State | | 2nd State | | 3rd State | | 4th State | |
| | Flip | State Updated | Flip | State Updated | Flip | State Updated | Flip | State Updated |
| $R(i, k) \geq V_{th}(i, 1)$ | ○ | 1st State | ○ | 1st State | ○ | 1st State | ○ | 1st State |
| $V_{th}(i, 1) > R(i, k) \geq V_{th}(i, 2)$ | X | 2nd State | ○ | 2nd State | ○ | 2nd State | ○ | 2nd State |
| $V_{th}(i, 2) > R(i, k) \geq V_{th}(i, 3)$ | X | 3rd State | X | 3rd State | ○ | 3rd State | ○ | 3rd State |
| $V_{th}(i, 3) > R(i, k) \geq V_{th}(i, 4)$ | X | 4th State | X | 4th State | X | 4th State | ○ | 4th State |
| $V_{th}(i, 4) > R(i, k)$ | X | 1st State | X | 2nd State | X | 3rd State | X | 4th State |

The syndrome check unit 570 may decide whether the currently repeated decoding successfully or not by using the third data. For example, when all the updated values of the check nodes have a value of '0', the syndrome check unit 570 may decide the currently repeated decoding as successful. However, when not all the updated values of the check nodes have a value of '0', the syndrome check unit 570 may decide the currently repeated decoding as failed. Herein, a check node having a value of '0' is a Satisfied Check Node (SCN), and a check node having a value of '1' is an Unsatisfied Check Node (UCN).

When the currently repeated decoding is determined as successful, the syndrome check unit 570 may output the updated value of each of the variable nodes included in the third data as the decoded data.

However, when the currently repeated decoding is determined as failed, the syndrome check unit 570 may decide to additionally perform the repeated decoding onto the third data. When it is decided to additionally perform the repeated decoding, the syndrome check unit 570 may provide the third data to the variable node update unit 530.

However, when the currently repeated decoding is determined as failed and a number of times that the repeated decoding is performed reaches a predetermined maximal number, the syndrome check unit 570 may finally decide the failure of the decoding for the code word. In this case, the syndrome check unit 570 may provide a code word decoding failure signal to the processor 134.

Figure 6:
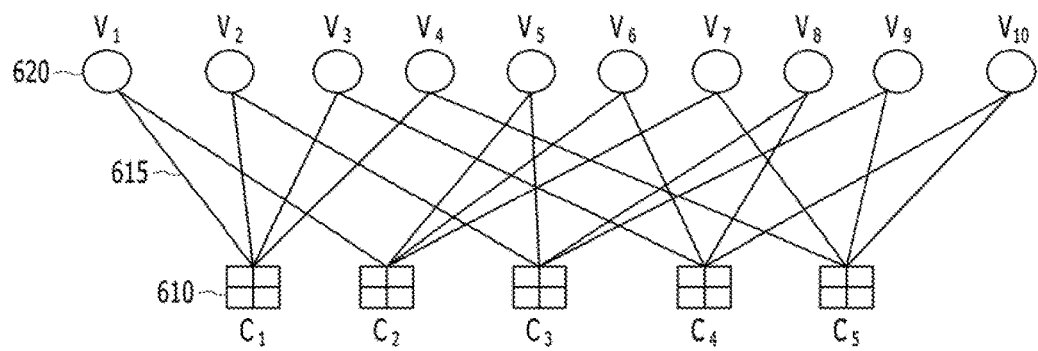
FIG. 6 is a bipartite graph between a variable node and a check node.
Figure 7:
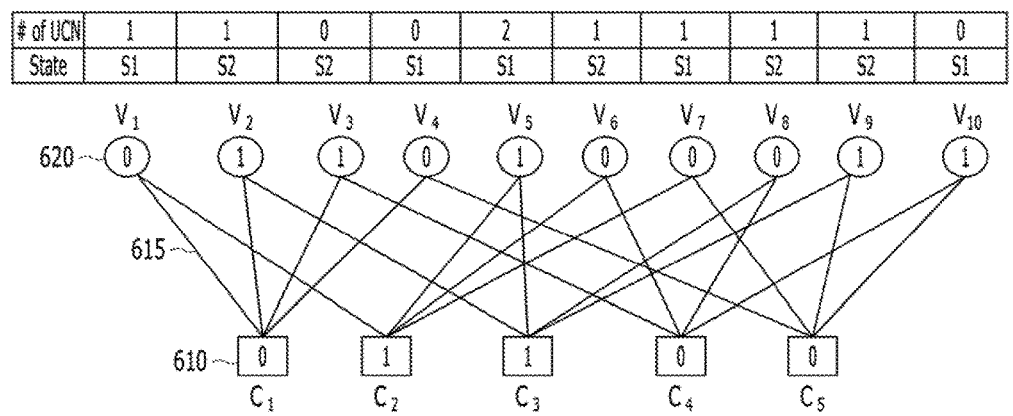
FIG. 7 illustrates a process of updating the variable node based on a syndrome check result.
Figure 8:
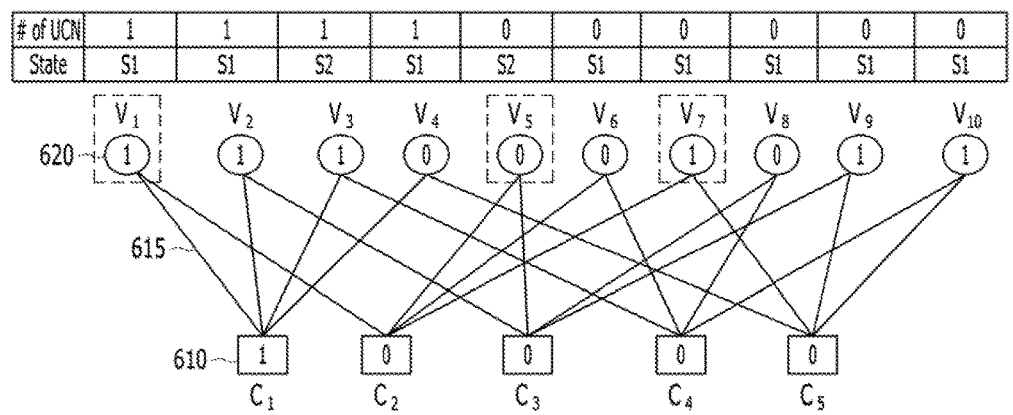
FIG. 8 illustrates a result of the process of updating the variable node shown in FIG. 7.

Hereafter, referring to FIGS. 6 to 8, the operations of the initialization unit 510, the variable node update unit 530, the check node update unit 550, and the syndrome check unit 570 are described in detail.

FIG. 6 is a bipartite graph between a variable node and a check node.

FIG. 7 illustrates a process of updating the variable node based on a syndrome test result.

FIG. 8 illustrates a result of the process of updating the variable node shown in FIG. 7.

When a code word is formed of an n-bit sequence and a message of the code word is formed of a k-bit sequence, there are n variable nodes and n-k check nodes. As exemplified in FIG. 6, when a code word is formed of a 10-bit sequence and a message of the code word is formed of a 5-bit sequence, there are 10 variable nodes 620 and 5 check nodes 610.

Each of the variable nodes 620 and each of the check nodes 610 may be coupled to edges 615 according to a predetermined parity check matrix H of the code word. To be specific, when the component of the predetermined parity check matrix H has a value of '1', the variable nodes 620 and the check nodes 610 corresponding to the component may be coupled to the edges 615.

For example, when the predetermined parity check matrix H may be represented by the following Equation 3, the coupling relationship between the variable nodes 620 and the check nodes 610 may be as shown in FIG. 6. In other words, the bipartite graph of FIG. 6 may be another representation of the predetermined parity check matrix H.

$$H = \begin{pmatrix} 1 & 1 & 1 & 1 & 0 & 0 & 0 & 0 & 0 & 0 \\ 1 & 0 & 0 & 0 & 1 & 1 & 1 & 0 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{pmatrix}$$ [Equation 3]

Referring to FIG. 7, when the code word is {'0', '1', '1', '0', '1', '0', '0', '0', '1', '1'}, the initialization unit 510 may set the initial values of the variable nodes 620 to {'0', '1', '1', '0', '1', '0', '0', '0', '1', '1'}.

Subsequently, the initialization unit 510 may set the initial state of each of the variable nodes 620. As shown in FIG. 7, the variable nodes may have two states. When the initialization unit 510 randomly sets the initial states of the variable nodes 620, the initial states of the variable nodes 620 may be {'S1', 'S2', 'S2', 'S1', 'S1', 'S2', 'S1', 'S2', 'S2', 'S1'}.

The initialization unit 510 may initialize the check nodes based on the initialized variable nodes. For example, the initialization unit 510 may initialize the value of each of the check nodes with a result of a Modulo 2 operation to the sum of the initial values of the variable nodes coupled to the check nodes. As illustrated in FIG. 7, the initial values of the variable nodes 620 are {'0', '1', '1', '0', '1', '0', '0', '0', '1', '1'}, the initial values of the check nodes 610 may be {'0', '1', '1', '0', '0'}.

The flip reference value setting unit 531 may set the flip reference value for deciding whether to flip the value of each of the variable nodes 620 or not based on the first data that includes the initial values of the variable nodes 620 and the initial values of the check nodes 610 that are provided from the initialization unit 510.

According to the example shown in FIG. 7, since the current number of times that the repeated decoding is performed is '1' and the $N_{UCN}(0)$ calculated based on the first data is '2', the flip reference value setting unit 531 may calculate the reference flip values as $(2+\alpha_j) \times \beta_j$ based on the Equation 1.

Furthermore, according to the example shown in FIG. 7, since the current number of times that the repeated decoding is performed is '1' and the $N_{UCN}(0,k)$ and $N_{SCN}(0,k)$ are calculated based on the first data, the flip reference value setting unit 531 may calculate the reliability values $R(0,k)$ based on the Equation 2 as the following Table 3.

TABLE 3

| Value | VK | | | | | | | | | |
|---|---|---|---|---|---|---|---|---|---|---|
| | V1 | V2 | V3 | V4 | V5 | V6 | V7 | V8 | V9 | V10 |
| $N_{UCN}(0, k)$ | 1 | 1 | 0 | 0 | 2 | 1 | 1 | 1 | 1 | 0 |
| $N_{SCN}(0, k)$ | 1 | 1 | 2 | 2 | 0 | 1 | 1 | 1 | 1 | 2 |
| $R(0, k)$ | $\gamma_j + \delta_j$ | $\gamma_j + \delta_j$ | $2 \cdot \delta_j$ | $2 \cdot \delta_j$ | $2 \cdot \gamma_j$ | $\gamma_j + \delta_j$ | $\gamma_j + \delta_j$ | $\gamma_j + \delta_j$ | $\gamma_j + \delta_j$ | $2 \cdot \delta_j$ |

The flip reference value setting unit 531 may set the calculated reference flip values and reliability values as the flip reference values for the first repeated decoding.

The update unit 533 may flip the initial value of each of the variable nodes and, at the same time, update the state of each of the variable nodes based on the first data including the initial value and initial state of each of the variable nodes from the initialization unit 510 and the flip reference values from the flip reference value setting unit 531.

The check node update unit 550 may update the check nodes based on the second data including the updated value and updated state of each of the variable nodes provided from the update unit 533. For example, the check node update unit 550 may update the value of each of the check nodes with a result of a Modulo 2 operation to the sum of the update values of the variable nodes coupled to the check nodes.

The syndrome check unit 570 may decide whether the currently repeated decoding is performed successfully or not based on the third data including the updated value of each of the variable nodes 620 and the updated value of each of the check nodes 610 and provided from the check node update unit 550. For example, when not all the updated values of the check nodes 610 have a value of '0', the syndrome check unit 570 may decide the first repeated decoding as failed.

The syndrome check unit 570 may decide whether to perform a second repeated decoding onto the third data. When the syndrome check unit 570 decides to perform the second repeated decoding onto the third data, the syndrome check unit 570 may transfer the third data to the variable node update unit 530.

The flip reference value setting unit 531 may set the flip reference value for deciding whether to flip the values of the variable nodes based on the third data.

The update unit 533 may flip the updated value of each of the variable nodes based on the updated values and updated states of the variable nodes included in the third data provided from the syndrome check unit 570 and the flip reference value provided from the flip reference value setting unit 531 and, at the same time, update the states of the variable nodes.

For example, when the variable nodes may have two states; the first reference flip value may be set to '2'; the second reference flip value may be set to '1'; and the reliability values of the variable nodes are set to be the same as the number of the unsatisfied check nodes that are coupled to the variable nodes in the second repeated decoding, the update unit 533 may flip the value of a first variable node V1 and may keep the current state because the reliability value (e.g., 1) of the first variable node V1 is equal to or greater than the second reference flip value and smaller than the first reference flip value.

Likewise, the update unit 533 may compare the reliability values of second to $10^{th}$ variable nodes V2 to V10 with the first and second reference flip values, decide whether to flip the values of the second to $10^{th}$ variable nodes V2 to V10 or not, and decide whether to change the state or not.

As exemplified in FIG. 8, the values of the first, fifth and seventh variable nodes V1, V5 and V7 may be flipped so as to update the values of the variable nodes 620 into {'1', '1', '1', '0', '0', '0', '1', '0', '1', '1'}, and the states of the second, fifth, sixth, eighth and ninth variable nodes V2, V5, V6, V8 and V9 may be changed so as to update the values of the variable nodes 620 into {'S1', 'S1', 'S2', 'S1', 'S2', 'S', 'S', 'S', 'S1', 'S'}.

Subsequently, the check node update unit 550 may update the check nodes based on the second data including the updated values and updated states of the variable nodes provided from the update unit 533. As illustrated in FIG. 8, when the updated values of the variable nodes 620 are {'1', '1', '1', '0', '0', '0', '1', '0', '1', '1'}, the values of the check nodes 610 may be {'1', '0', '0', '0', '0'}.

The syndrome check unit 570 may decide whether the repeated decoding that is performed currently is performed successfully or not based on the third data including the updated values of the variable nodes 620 and the updated values of the check nodes 610 provided from the check node update unit 550.

As exemplified in FIG. 8, the values of the check nodes 610 are {'1', '0', '0', '0', '0'}. Since not all the updated values of the check nodes 610 have a value of '0', the syndrome check unit 570 may decide the second repeated decoding as failed.

The syndrome check unit 570 may decide to perform a third repeated decoding onto the third data. However, when the predetermined maximal number of times that the repeated decoding is performed is two times, the syndrome check unit 570 may decide that the number of times that the repeated decoding is performed has reached the predetermined maximal number of times and finally decide the failure of the decoding operation performed onto the code word. In this case, the syndrome check unit 570 may transfer a decoding failure signal for the code word to the processor 134.

According to the operation method of the ECC unit 138 in accordance with the embodiment of the present invention, the number of the variable nodes that are flipped may be controlled appropriately by setting the states of the variable nodes and deciding whether to flip the value of each of the variable nodes based on the state of each of the variable nodes. In this way, the ECC unit 138 in accordance with the embodiment of the present invention may solve the problem of deteriorated error correction performance that occurs when the values of too many variable nodes or too small number of variable nodes are flipped based on a typical bit flip algorithm.

Hereafter, a data processing system and electronic devices to which the memory system 110 including the memory device 150 and the controller 130 that are described with reference to FIGS. 1 to 8 in accordance with the embodiments of the present invention are described in detail with reference to FIGS. 9 to 17.

Figure 9:
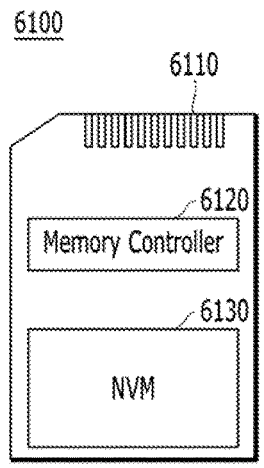
FIGS. 9 to 17 are diagrams schematically illustrating application examples of the data processing system of FIG. 1, in accordance with various embodiment of the present invention.

FIG. 9 is a diagram schematically illustrating another example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
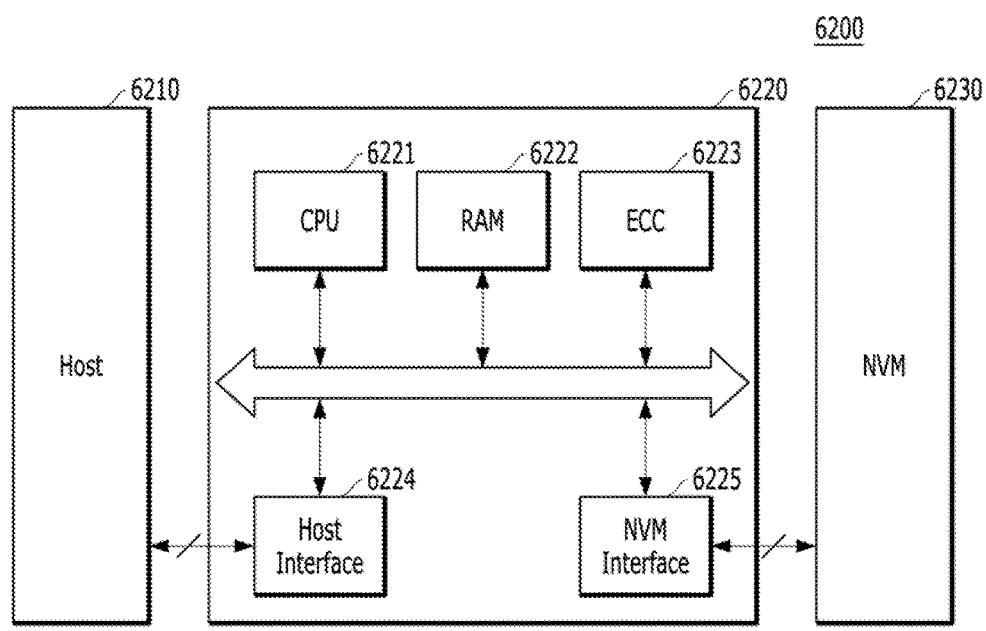

FIG. 10 is a diagram schematically illustrating another example of the data processing system including the memory system in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
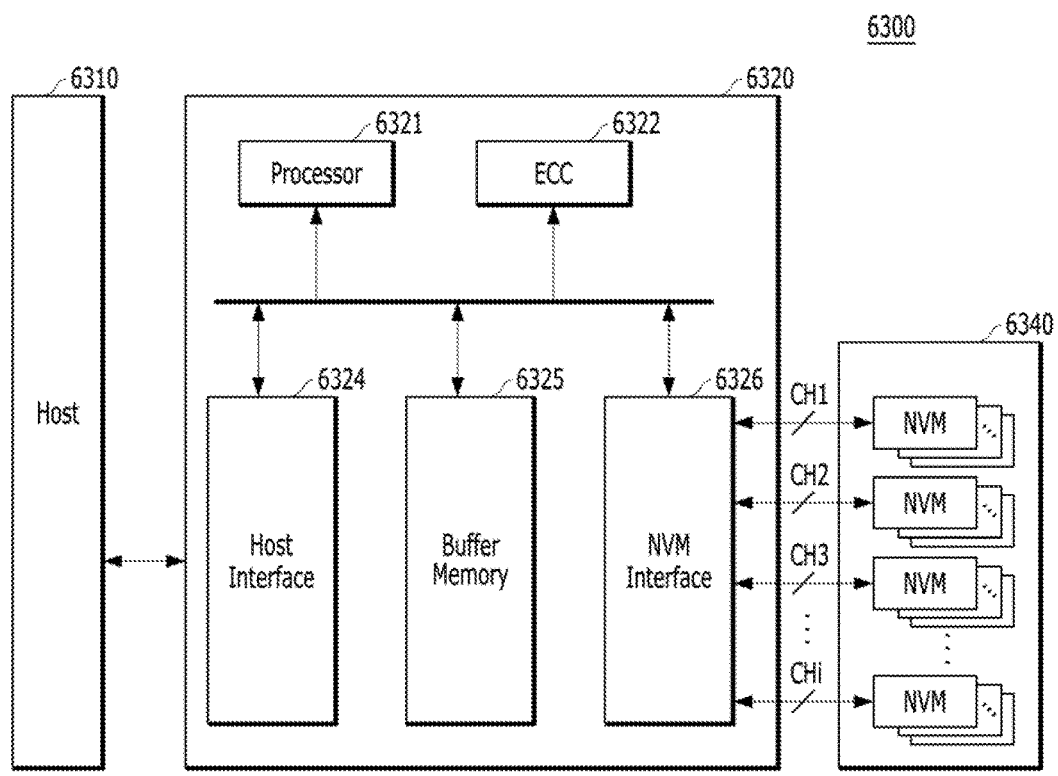

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
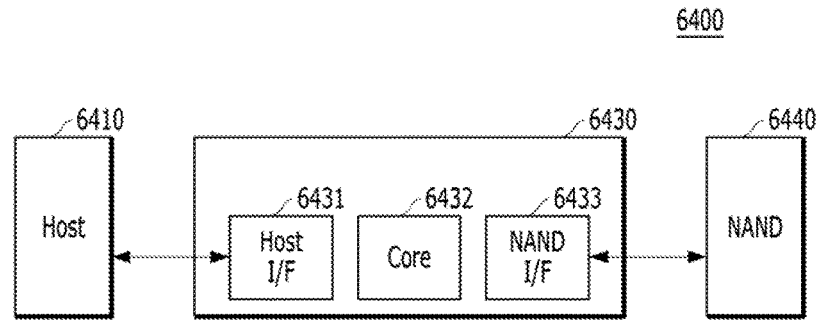

FIG. 12 is a diagram schematically illustrating another example of the data processing system including the memory system in accordance with the present embodiment. FIG. 12 schematically illustrates an embedded Multi-Media Card (eMMC) to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the present embodiment. FIGS. 13 to 16 schematically illustrate UFS (Universal Flash Storage) systems to which the memory system in accordance with the present embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
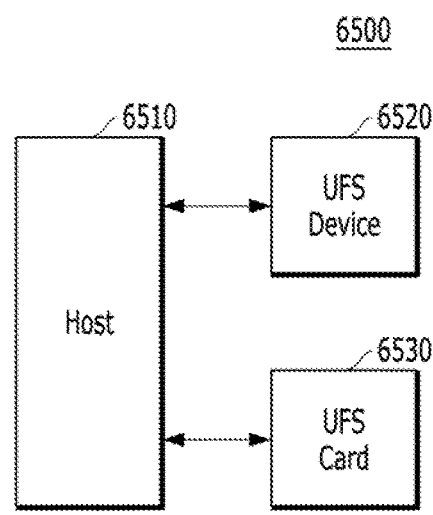

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
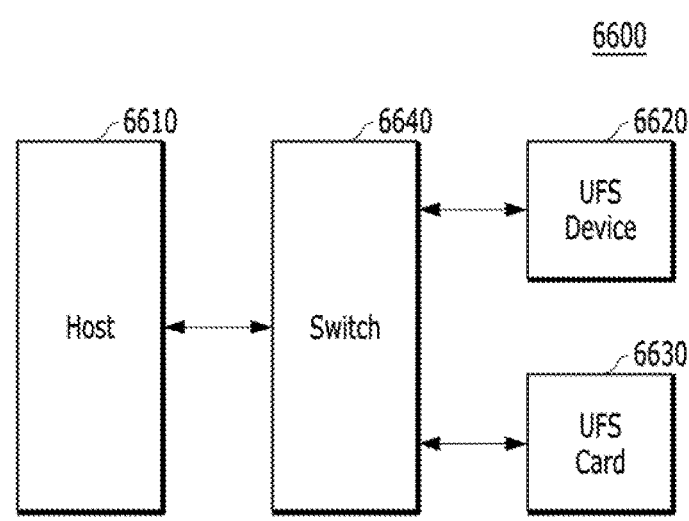

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
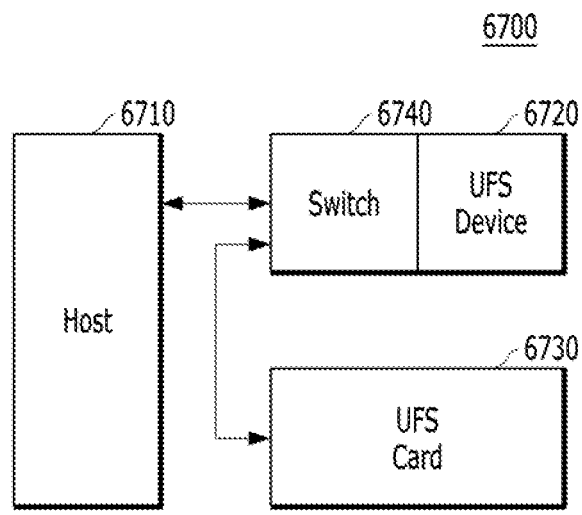

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
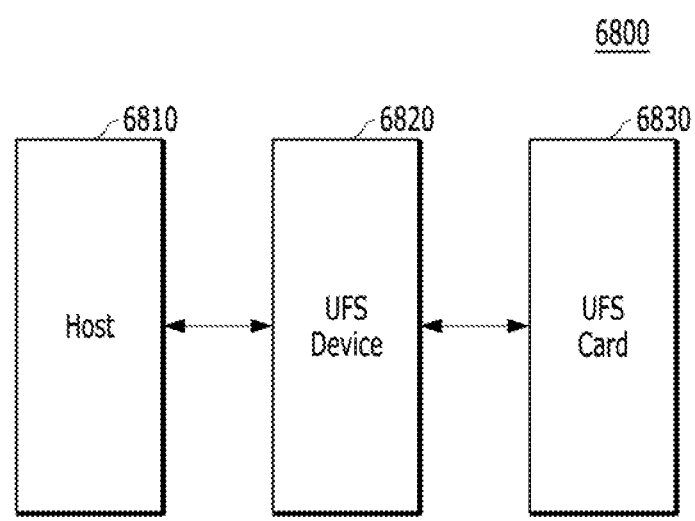

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
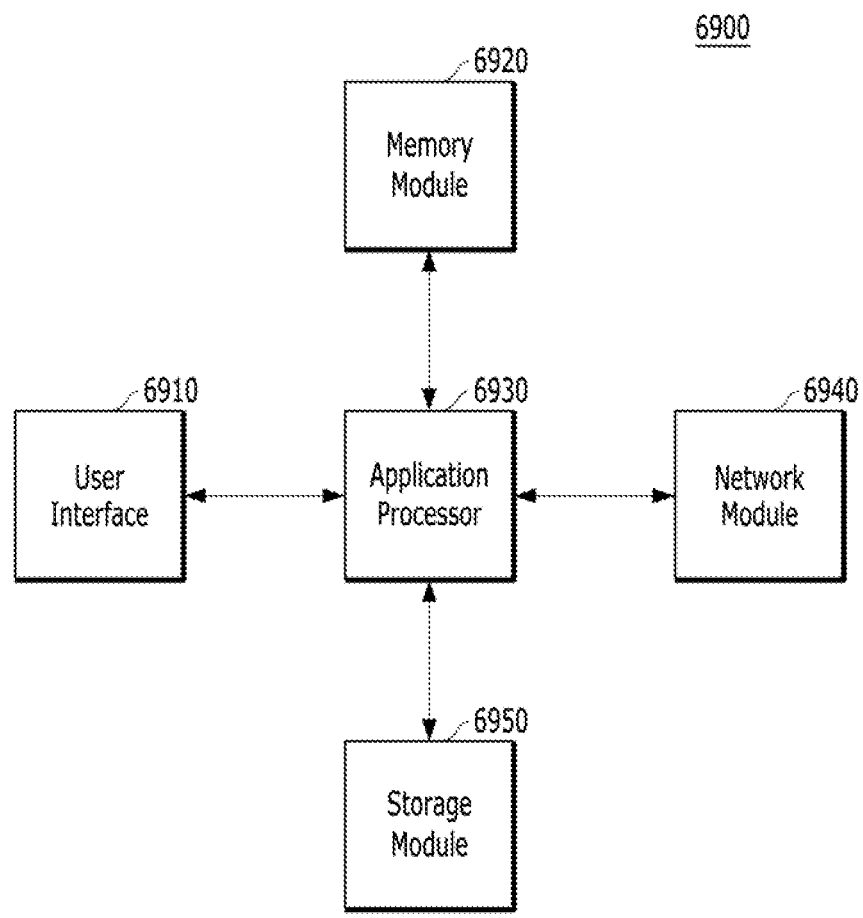

FIG. 17 is a diagram schematically illustrating another example of the data processing system including the memory system in accordance with an embodiment. FIG. 17 is a diagram schematically illustrating a user system to which the memory system in accordance with the present embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, the memory system and the method for operating the memory system may minimize the complexity and performance deterioration of the memory system, maximize the usage efficiency of a memory device, and rapidly and stably process data into a memory device.

While the present invention has been described with respect to the specific embodiments, it will be apparent to those skilled in the art that various changes and modifications may be made without departing from the spirit and scope of the invention as defined in the following claims.

What is claimed is:

1. A controller within a memory system comprising:
an initialization circuit suitable for initializing values and states of variable nodes and initializing values of check nodes;
a variable node update circuit suitable for updating the values and states of the variable nodes provided from the initialization circuit;
a check node update circuit suitable for updating the values of the check nodes based on the updated values and states of the variable nodes provided from the variable node update circuit; and
a syndrome check circuit suitable for deciding iteration of the operation of the variable node update circuit and the check node update circuit when the values of the check nodes provided from the check node update are not all in a satisfied state,
wherein the variable node update circuit calculates reliability values of the variable nodes and a reference flip value based on a result of a previous iteration, and
wherein the variable node update circuit updates the values and states of the variable nodes based on the reference flip value and the reliability values and states of the variable nodes.

2. The controller of claim 1, wherein the initialization circuit initializes the values and states of the variable nodes and initializes the values of the check nodes by using a code word read from a memory device.

3. The controller of claim 1,
wherein each of the variable nodes has one state among N states,
wherein the variable node update circuit updates a value of a first variable node by flipping the value of the first variable node when a reliability value of the first variable node having an $i^{th}$ state is equal to or greater than an $i^{th}$ reference flip value, and
wherein N is an integer equal to or greater than 2, and "i" is an integer ranging from 1 to N.

4. The controller of claim 3,
wherein the variable node update circuit updates the state of the first variable node into a $(j+1)^{th}$ state when the reliability value of the first variable node having the $i^{th}$ state is equal to or greater than a $(j+1)^{th}$ reference flip value and smaller than a $j^{th}$ reference flip value,
wherein the $j^{th}$ reference flip value is equal to or greater than the $(j+1)^{th}$ reference flip value, and
wherein "j" is an integer ranging from 1 to N−1.

5. The controller of claim 4, wherein the variable node update circuit updates a state of the first variable node into a first state when the reliability value of the first variable node having the $i^{th}$ state is equal to or greater than the first reference flip value.

6. The controller of claim 4, wherein the variable node update circuit keeps the state of the first variable node unchanged when the reliability value of the first variable node having the $i^{th}$ state is smaller than an $N^{th}$ reference flip value.

7. The controller of claim 3, wherein N is 2.

8. The controller of claim 3, wherein N is 4.

9. The controller of claim 1, wherein when the values of all of the check nodes are '0', the values of the check nodes are all in the satisfied state.

10. A method for operating a controller within a memory system, the method comprising:
initializing, by an initialization circuit, values and states of variable nodes and initializing values of check nodes;
updating, by a variable node update circuit, the values and states of the variable nodes; updating, by a check node update circuit, the values of the check nodes based on the updated values and states of the variable nodes; and
deciding, by a syndrome check circuit, iteration of the updating of the values and states of the variable nodes and the updating of the values of the check nodes when the values of the check nodes are not all in a satisfied state,
wherein the updating of the values and states of the variable nodes includes:
calculating, by a variable node update circuit, a reference flip value and reliability values of the variable nodes based on a result of a previous iteration; and
updating, by a variable node update circuit, the values and states of the variable nodes based on the reference flip value and the reliability values of the variable nodes.

11. The method of claim 10, wherein the initializing is performed by using a code word read from a memory device.

12. The method of claim 10,
wherein each of the variable nodes has one state among N states,
wherein the updating of the values and states of the variable nodes includes updating a value of a first variable node, when a reliability value of the first variable node having an $i^{th}$ state is equal to or greater than an $i^{th}$ reference flip value in the updating of the values and states of the variable nodes, and
wherein N is an integer equal to or greater than 2, and "i" is an integer ranging from 1 to N.

13. The method of claim 12,
wherein the updating of the values and states of the variable nodes includes updating the state of the first variable node into a $(j+1)^{th}$ state, when the reliability value of the first variable node having the $i^{th}$ state is equal to or greater than a $(j+1)^{th}$ reference flip value and smaller than a $j^{th}$ reference flip value in the updating of the values and states of the variable nodes,
wherein the $j^{th}$ reference flip value is equal to or greater than the $(j+1)^{th}$ reference flip value, and
wherein j is an integer ranging from 1 to N−1.

14. The method of claim 13, wherein the updating of the values and states of the variable nodes includes updating a state of the first variable node into a first state when the reliability value of the first variable node having the $i^{th}$ state is equal to or greater than the first reference flip value.

15. The method of claim 13, wherein the updating of the values and states of the variable nodes includes keeping the state of the first variable node unchanged when the reliability value of the first variable node having the $i^{th}$ state is smaller than an $N^{th}$ reference flip value.

16. The method of claim 12, wherein N is '2'.

17. The method of claim 12, wherein N is '4'.

18. The method of claim 10, wherein when the values of all of the check nodes are '0', the values of the check nodes are all in the satisfied state.

* * * * *